(12) United States Patent
Ha et al.

(10) Patent No.: US 9,495,859 B2
(45) Date of Patent: Nov. 15, 2016

(54) HOME APPLIANCE AND METHOD OF OUTPUTTING SIGNAL SOUND FOR DIAGNOSIS

(71) Applicant: LG ELECTRONICS INC., Seoul (KR)

(72) Inventors: Sangdoo Ha, Changwon-si (KR); Jinwook Lee, Changwon-si (KR); Moonhyun Kim, Changwon-si (KR); Deoghyeon Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 552 days.

(21) Appl. No.: 13/933,467

(22) Filed: Jul. 2, 2013

(65) Prior Publication Data

US 2014/0015684 A1    Jan. 16, 2014

(30) Foreign Application Priority Data

Jul. 3, 2012  (KR) .......................... 10-2012-0072381

(51) Int. Cl.
   *G01R 31/08*    (2006.01)
   *G08B 23/00*    (2006.01)
   *H04L 27/28*    (2006.01)
   *H04L 12/28*    (2006.01)

(52) U.S. Cl.
   CPC ............. *G08B 23/00* (2013.01); *H04L 12/282* (2013.01); *H04L 12/2825* (2013.01); *H04L 27/28* (2013.01); *H04L 2012/285* (2013.01)

(58) Field of Classification Search
   USPC ...................................... 379/106.01; 340/679
   See application file for complete search history.

(56) References Cited

U.S. PATENT DOCUMENTS

| | | | |
|---|---|---|---|
| 3,910,322 | A | 10/1975 | Hardesty et al. |
| 4,146,754 | A | 3/1979 | Rose |
| 4,241,337 | A | 12/1980 | Prada |
| 4,766,505 | A | 8/1988 | Nakano et al. |
| 4,797,656 | A | 1/1989 | Keppler |
| 4,897,659 | A | 1/1990 | Mellon |
| 4,897,857 | A | 1/1990 | Wakatsuki et al. |
| 4,916,439 | A | 4/1990 | Estes et al. |
| 4,977,394 | A | 12/1990 | Manson et al. |
| 5,103,214 | A | 4/1992 | Curran et al. |

(Continued)

FOREIGN PATENT DOCUMENTS

| | | |
|---|---|---|
| CA | 2 722 912 | 11/2009 |
| CN | 1212304 | 3/1999 |

(Continued)

OTHER PUBLICATIONS

Chinese Office Action dated Dec. 16, 2013.(translation).

(Continued)

*Primary Examiner* — Duc C Ho
(74) *Attorney, Agent, or Firm* — KED & Associates, LLP (57) ABSTRACT

Provided are a home appliance and a method of outputting a signal sound for diagnosis. The home appliance includes: a selection unit for receiving a diagnosis command on the home appliance from a user; a memory for storing diagnosis data on the home appliance; a controller for processing the diagnosis data stored in the memory in order to generate a packet according to a diagnosis command input through the selection unit; a conversion unit for generating a frame including a combination of symbols, which respectively correspond to four different carrier frequencies, on the basis of data constituting the packet, according to a Quadrature Frequency Shift Keying (QFSK) method.

24 Claims, 8 Drawing Sheets

(56) References Cited

U.S. PATENT DOCUMENTS

| | | | |
|---|---|---|---|
| 5,210,784 A | 5/1993 | Wang et al. | |
| 5,268,666 A | 12/1993 | Michel et al. | |
| 5,287,084 A | 2/1994 | Sone | |
| 5,452,344 A | 9/1995 | Larson | |
| 5,506,892 A | 4/1996 | Kojima et al. | |
| 5,586,174 A | 12/1996 | Bogner et al. | |
| 5,664,218 A | 9/1997 | Kim et al. | |
| 5,757,643 A | 5/1998 | Kuroda et al. | |
| 5,774,529 A | 6/1998 | Johannsen et al. | |
| 5,787,724 A | 8/1998 | Pohl | |
| 5,864,828 A | 1/1999 | Atkins | |
| 5,939,992 A | 8/1999 | Devries et al. | |
| 5,940,915 A | 8/1999 | Nam | |
| 5,987,105 A | 11/1999 | Jenkins et al. | |
| 6,121,593 A | 9/2000 | Mansbery et al. | |
| 6,157,313 A | 12/2000 | Emmermann | |
| 6,370,890 B2 | 4/2002 | Roh | |
| 6,424,252 B1 | 7/2002 | Adler | |
| 6,727,814 B2 | 4/2004 | Saltzstein et al. | |
| 6,759,954 B1 | 7/2004 | Myron et al. | |
| 6,763,458 B1 | 7/2004 | Watanabe et al. | |
| 6,778,868 B2 | 8/2004 | Imamura et al. | |
| 6,784,801 B2 | 8/2004 | Watanabe et al. | |
| 6,870,480 B2 | 3/2005 | Suzuki et al. | |
| 6,873,255 B2 | 3/2005 | Gallagher | |
| 6,906,617 B1 | 6/2005 | Van der Meulen | |
| 7,010,612 B1 | 3/2006 | Si et al. | |
| 7,135,982 B2 | 11/2006 | Lee | |
| 7,174,264 B2 | 2/2007 | Yasukawa et al. | |
| 7,208,916 B1 | 4/2007 | Boatwright | |
| 7,243,174 B2 | 7/2007 | Sheahan et al. | |
| 7,266,164 B2 | 9/2007 | Jeon et al. | |
| 7,280,643 B2 | 10/2007 | Howard et al. | |
| 7,337,457 B2 | 2/2008 | Pack et al. | |
| 7,363,031 B1 | 4/2008 | Aisa | |
| 7,383,644 B2 | 6/2008 | Lyu et al. | |
| 7,439,439 B2 | 10/2008 | Hayes et al. | |
| 7,509,824 B2 | 3/2009 | Park et al. | |
| 7,558,700 B2 | 7/2009 | Yamashita et al. | |
| 7,574,269 B2 | 8/2009 | Cenedese et al. | |
| 7,631,063 B1 | 12/2009 | Ho et al. | |
| 7,648,476 B2 | 1/2010 | Bock et al. | |
| 7,653,512 B2 | 1/2010 | Cheung et al. | |
| 7,750,227 B2 | 7/2010 | Hayes et al. | |
| 7,843,819 B1 | 11/2010 | Benveniste | |
| 7,965,632 B2 | 6/2011 | Sugaya | |
| 8,027,752 B2 | 9/2011 | Castaldo et al. | |
| 8,040,234 B2 | 10/2011 | Ebrom et al. | |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,325,054 B2 | 12/2012 | Kim et al. | |
| 8,346,508 B2 | 1/2013 | Kim et al. | |
| 8,391,255 B2 | 3/2013 | Ribiere et al. | |
| 8,428,910 B2 | 4/2013 | Papadimitriou et al. | |
| 8,739,057 B2 | 5/2014 | Cheong | |
| 2002/0029575 A1 | 3/2002 | Okamoto | |
| 2002/0032491 A1 | 3/2002 | Imamura et al. | |
| 2002/0078742 A1 | 6/2002 | Kim | |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0000240 A1 | 1/2003 | Pahl | |
| 2003/0028345 A1 | 2/2003 | Watkins et al. | |
| 2003/0058101 A1 | 3/2003 | Watanabe et al. | |
| 2003/0110363 A1 | 6/2003 | Bachot et al. | |
| 2003/0128850 A1 | 7/2003 | Kimura et al. | |
| 2003/0144010 A1 | 7/2003 | Dollinger | |
| 2003/0167782 A1 | 9/2003 | Roh et al. | |
| 2003/0196492 A1 | 10/2003 | Remboski et al. | |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0028034 A1 | 2/2005 | Gantman et al. | |
| 2005/0029976 A1 | 2/2005 | Terry et al. | |
| 2005/0062600 A1 | 3/2005 | Olsen | |
| 2005/0086979 A1 | 4/2005 | Son et al. | |
| 2005/0129200 A1 | 6/2005 | Forrest et al. | |
| 2005/0134472 A1 | 6/2005 | Jang et al. | |
| 2005/0162909 A1 | 7/2005 | Wooldridge | |
| 2005/0222859 A1 | 10/2005 | Ha | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0097622 A1 | 5/2007 | Leech | |
| 2007/0113595 A1 | 5/2007 | Harwood et al. | |
| 2007/0114293 A1 | 5/2007 | Gugenheim | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0254604 A1* | 11/2007 | Kim | H04W 84/18 455/88 |
| 2007/0272286 A1 | 11/2007 | Curtius et al. | |
| 2008/0007520 A1 | 1/2008 | Lee | |
| 2008/0036619 A1 | 2/2008 | Rhodes et al. | |
| 2008/0037011 A1 | 2/2008 | Rookie | |
| 2008/0072383 A1 | 3/2008 | Bextermoller et al. | |
| 2008/0122648 A1 | 5/2008 | Ebrom et al. | |
| 2008/0181058 A1 | 7/2008 | Hayakawa | |
| 2009/0036778 A1 | 2/2009 | Cohen et al. | |
| 2009/0067102 A1 | 3/2009 | Cline et al. | |
| 2009/0077167 A1 | 3/2009 | Baum | |
| 2009/0160637 A1 | 6/2009 | Maeng | |
| 2009/0165471 A1 | 7/2009 | Rafalovich | |
| 2009/0165475 A1 | 7/2009 | Wasserman | |
| 2009/0169434 A1 | 7/2009 | Ogusu | |
| 2009/0217682 A1 | 9/2009 | Son | |
| 2009/0248245 A1 | 10/2009 | Sumiya | |
| 2009/0257354 A1* | 10/2009 | Hannel | H04J 3/0697 370/241 |
| 2009/0282308 A1 | 11/2009 | Gutsche et al. | |
| 2009/0289536 A1 | 11/2009 | Park | |
| 2009/0323913 A1 | 12/2009 | Lee et al. | |
| 2009/0323914 A1 | 12/2009 | Lee et al. | |
| 2010/0023938 A1 | 1/2010 | Lee et al. | |
| 2010/0027770 A1 | 2/2010 | Park et al. | |
| 2010/0037401 A1 | 2/2010 | Bae et al. | |
| 2010/0040213 A1* | 2/2010 | Park | H04M 11/002 379/106.01 |
| 2010/0116060 A1 | 5/2010 | Murayama | |
| 2010/0262865 A1 | 10/2010 | Kim | |
| 2010/0318324 A1 | 12/2010 | Kim et al. | |
| 2011/0018729 A1 | 1/2011 | Kim et al. | |
| 2011/0022358 A1 | 1/2011 | Han et al. | |
| 2011/0054845 A1 | 3/2011 | Han et al. | |
| 2011/0060553 A1 | 3/2011 | Han et al. | |
| 2011/0074589 A1* | 3/2011 | Han | H04L 12/2825 340/618 |
| 2011/0200189 A1 | 8/2011 | True et al. | |

FOREIGN PATENT DOCUMENTS

| | | |
|---|---|---|
| CN | 1343862 | 4/2002 |
| CN | 1393672 | 1/2003 |
| CN | 1409886 | 4/2003 |
| CN | 1424843 | 6/2003 |
| CN | 1690685 | 11/2005 |
| CN | 2797999 | 7/2006 |
| CN | 101447119 | 6/2009 |
| CN | 101680693 | 3/2010 |
| CN | 102017519 | 4/2011 |
| CN | 102017520 | 4/2011 |
| CN | 102017593 | 4/2011 |
| CN | 102388572 | 3/2012 |
| CN | 102388574 | 3/2012 |
| CN | 102498691 | 6/2012 |

(56) References Cited

FOREIGN PATENT DOCUMENTS

| | | |
|---|---|---|
| CN | 102915004 | 2/2013 |
| CN | 103053136 | 4/2013 |
| EP | 0 038 687 | 10/1981 |
| EP | 0 510 519 | 10/1992 |
| EP | 0 617 557 | 9/1994 |
| EP | 0 691 060 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | 4-358497 | 12/1992 |
| JP | 04-358497 | 12/1992 |
| JP | 07-239176 | 9/1995 |
| JP | 11-127254 | 5/1999 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-031471 | 1/2002 |
| JP | 2002-045590 | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 | 12/1991 |
| KR | 10-1996-0003308 | 1/1996 |
| KR | 10-1997-0019443 | 4/1997 |
| KR | 10-0127232 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 | 4/2000 |
| KR | 10-2001-0036913 | 5/2001 |
| KR | 10-2001-0055394 | 7/2001 |
| KR | 10-2002-0020831 | 3/2002 |
| KR | 10-2002-0030426 | 4/2002 |
| KR | 10-2002-0039959 | 5/2002 |
| KR | 10-2003-0000189 | 1/2003 |
| KR | 10-2004-0050767 | 6/2004 |
| KR | 10-2004-0095017 | 11/2004 |
| KR | 10-2005-0062747 | 6/2005 |
| KR | 10-2005-0097282 | 10/2005 |
| KR | 10-2006-0056973 | 5/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2009-0114309 | 11/2009 |
| KR | 10-2009-0115066 | 11/2009 |
| KR | 10-2009-0115078 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 01/50669 A1 | 7/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |
| WO | WO 2011/087329 | 4/2011 |

OTHER PUBLICATIONS

European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
Korean Office Action dated Feb. 26, 2014.
Korean Office Action dated Feb. 28, 2014.
Chinese Office Action dated Mar. 4, 2014.
Chinese Office Action dated Mar. 5, 2014.
U.S. Office Action issued in U.S. Appl. No. 13/588,164 dated Apr. 3, 2015.
U.S. Final Office Action issued in U.S. Appl. No. 13/562,704 dated Apr. 9, 2015.
Russian Office Action issued in Application No. 2013130254 dated Jan. 23, 2015.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
U.S. Office Action issued in U.S. Appl. No. 12/842,649 dated Aug. 15, 2014.
U.S. Notice of Allowance issued in U.S. Appl. No. 13/382,334 dated Nov. 12, 2014.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
Australian Office Action dated Sep. 22, 2014.
Chinese Office Action dated Oct. 8, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.
Chinese Office Action dated Oct. 30, 2014.
Japanese Office Action dated Nov. 18, 2014.
Chinese Office Action dated Dec. 3, 2014.
U.S. Notice of Allowance issued in U.S. Appl. No. 13/922,669 dated Dec. 31, 2014.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
International Search Report dated Aug. 23, 2010 issued in Application No. PCT/KR2010/000319.
International Search Report dated Dec. 1, 2010 issued in Application No. PCT/KR2010/002222.
International Search Report dated Dec. 1, 2010 issued in Application No. PCT/KR2010/002211.
International Search Report dated Apr. 25, 2011 issued in Application No. PCT/KR 2010/004407.
International Search Report dated May 26, 2011 issued in Application No. PCT/KR2010/005108.
International Search Report issued in Application No. PCT/KR2011/000311 dated Jul. 28, 2011.
European Search Report dated Oct. 14, 2011 issued in Application No. 09 73 8950.

(56) References Cited

OTHER PUBLICATIONS

United States Office Action dated Dec. 27, 2011 issued in U.S. Appl. No. 12/432,184.
Russian Office Action dated Feb. 7, 2012. (with translation).
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
U.S. Office Action issued in U.S. Appl. No. 12/431,903 dated Mar. 8, 2012.
U.S. Office Action issued in U.S. Appl. No. 12/431,893 dated Mar. 19, 2012.
International Search Report issued in PCT Application No. KR2011/004949 dated Mar. 20, 2012.
U.S. Office Action issued in U.S. Appl. No. 12/432,132 dated Mar. 20, 2012.
International Search Report issued in PCT Application No. KR2011/004948 dated Mar. 26, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
Russian Office Action issued in Application No. 2010144513/08 dated Jun. 27, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Korean Office Action dated Aug. 13, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
European Search Report dated Dec. 17, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
European Search Report dated Jan. 2, 2013.
U.S. Office Action issued in U.S. Appl. No. 12/431,903 dated Jan. 2, 2013.
U.S. Notice of Allowance issued in U.S. Appl. No. 12/847,303 dated Jan. 11, 2013.
U.S. Office Action issued in U.S. Appl. No. 12/757,246 dated Jan. 17, 2013.
Ethem M Sözer; "Simulation and Rapid Prototyping Environment for Underwater Acoustic Communications: Reconfigurable Modem"; OCEANS-Europe 2005; MIT Sea Grant College Program; Cambridge, MA, 02139; IEEE; pp. 80-85 (XP10838461A).
U.S. Office Action issued in U.S. Appl. No. 12/431,893 dated Jan. 29, 2013.
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
Chinese Office Action dated Feb. 3, 2016.
European Search Report dated Feb. 5, 2016.
U.S. Office Action issued in U.S. Appl. No. 13/522,066 dated Mar. 2, 2016.
U.S. Office Action issued in U.S. Appl. No. 13/588,164 dated Mar. 17, 2016.
U.S. Office Action issued in U.S. Appl. No. 13/808,403 dated Apr. 7, 2016.
European Search Report dated Mar. 23, 2016.
European Search Report dated Jun. 20, 2016.
U.S. Office Action issues in U.S. Appl. No. 13/808,403 dated Aug. 4, 2016.
U.S. Office Action issued in U.S. Appl. No. 13/588,164 dated Aug. 5, 2016.
U.S. Office Action issued in U.S. Appl. No. 13/522,066 dated Aug. 25, 2016.
U.S. Appl. No. 13/808,414, filed Jan. 4, 2013.
U.S. Appl. No. 13/808,403, filed Jan. 4, 2013.
U.S. Appl. No. 12/842,649, filed Jul. 23, 2010.
U.S. Appl. No. 13/522,066, filed Jul. 13, 2012.
U.S. Appl. No. 13/562,704, filed Jul. 31, 2012.
U.S. Appl. No. 13/588,164, filed Aug. 17, 2012.

* cited by examiner

| Preamble | App. Payload | Frame Check Sequence | Tail Symbol |
|---|---|---|---|
| 8 sym | 48 sym | 8 sym | 2 sym |

US 9,495,859 B2

HOME APPLIANCE AND METHOD OF OUTPUTTING SIGNAL SOUND FOR DIAGNOSIS

This application claims priority to Korean Patent application no. 10-2012-0072381 filed Jul. 3, 2012, which is hereby incorporated by reference.

BACKGROUND

1. Field

The present disclosure relates to a home appliance for outputting diagnosis data as a signal sound and a method of outputting such a signal sound.

2. Description of the Related Art

Typically, a user contacts a service center when a home appliance breaks down and a technician personally visits the user for repair. However, such a personal visit by a technician causes excessive costs and also, without prior information on the home appliance, it is difficult to repair the home appliance effectively. Later, with the development of technology, a telephone network is used to remotely diagnose failure information.

Moreover, European patent application no. EP0510519 discloses a technique that sending failure information on a home appliance to a service center via a telephone network with a modem connected to the home appliance. However, in this case, there is a problem that the modem needs to be always connected the home appliance. Especially, since a home appliance such as a laundry washing machine is generally installed outdoors, there is difficulty connecting the laundry washing machine to a telephone network.

U.S. Pat. No. 5,987,105 discloses a method of controlling a home appliance that converts information on the operation of a home appliance into a sound signal and outputs it through a telephone network. Such a control method sends a sound signal outputted from a home appliance to a service center through a user's phone. In terms of the structure of the data packets constituting the sound signal, the information to be transmitted into a plurality of packets for output. One packet is configured with a 2.97 sec duration, and when one packet is outputted, the next packet is outputted 730 ms later. Accordingly, outputting all the information to be transmitted takes more than 3 sec.

A portable terminal such as a mobile phone or smart phone provides a noise canceling function. When a signal having a predetermined frequency is continuously detected for a predetermined time (about 3 sec), such a noise canceling function recognizes the signal as noise. Furthermore, the signal sound intensity is drastically reduced or distorted by a communication environment when the signal sound is inputted to a portable terminal, as disclosed in U.S. Pat. No. 5,987,105. Even when an idle period (for example, 730 ms) is set between packets (each length configured with less than 3 sec), the signal may still be recognized as noise. For reference, U.S. Pat. No. 5,987,105 provides no suggestion or recognition of the noise canceling function of a portable terminal, let alone a method of evading the above issue.

SUMMARY

Aspects of an invention are defined in the appended independent claims.

The foregoing and other objects, features, aspects and advantages of a device and method in accordance with the present disclosure will become more apparent from the following detailed description when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

While specific terms are used, they are not used to limit the meaning or the scope of the present disclosure described in Claims, but merely used to explain the present disclosure. Accordingly, a person having ordinary skill in the art will understand from the above that various modifications and other equivalent embodiments are also possible. The invention is not restricted to the described embodiments but extends to the full scope of the accompanying Claims. Like reference numerals refer to like elements throughout.

Figure 1:
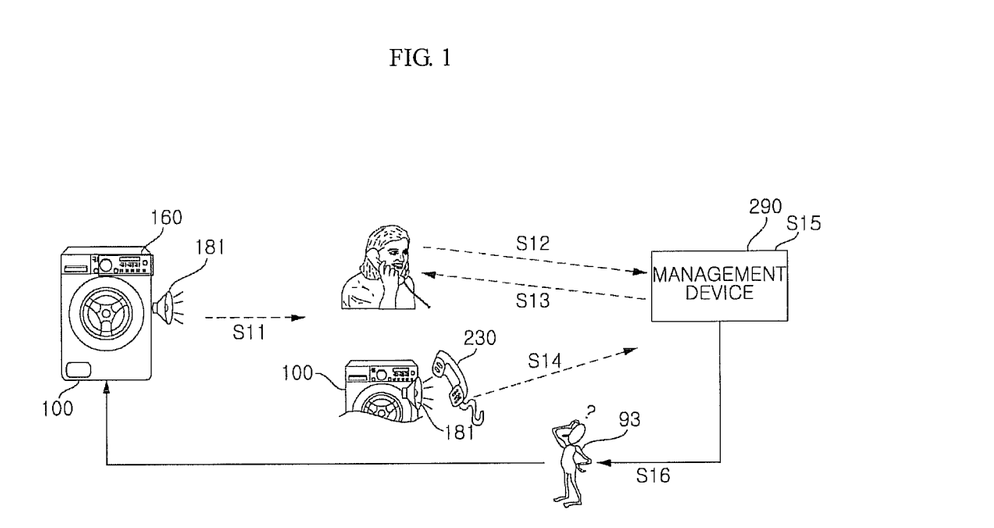
FIG. 1 is a view illustrating a process for diagnosing a home appliance according to an embodiment.
Figure 2:
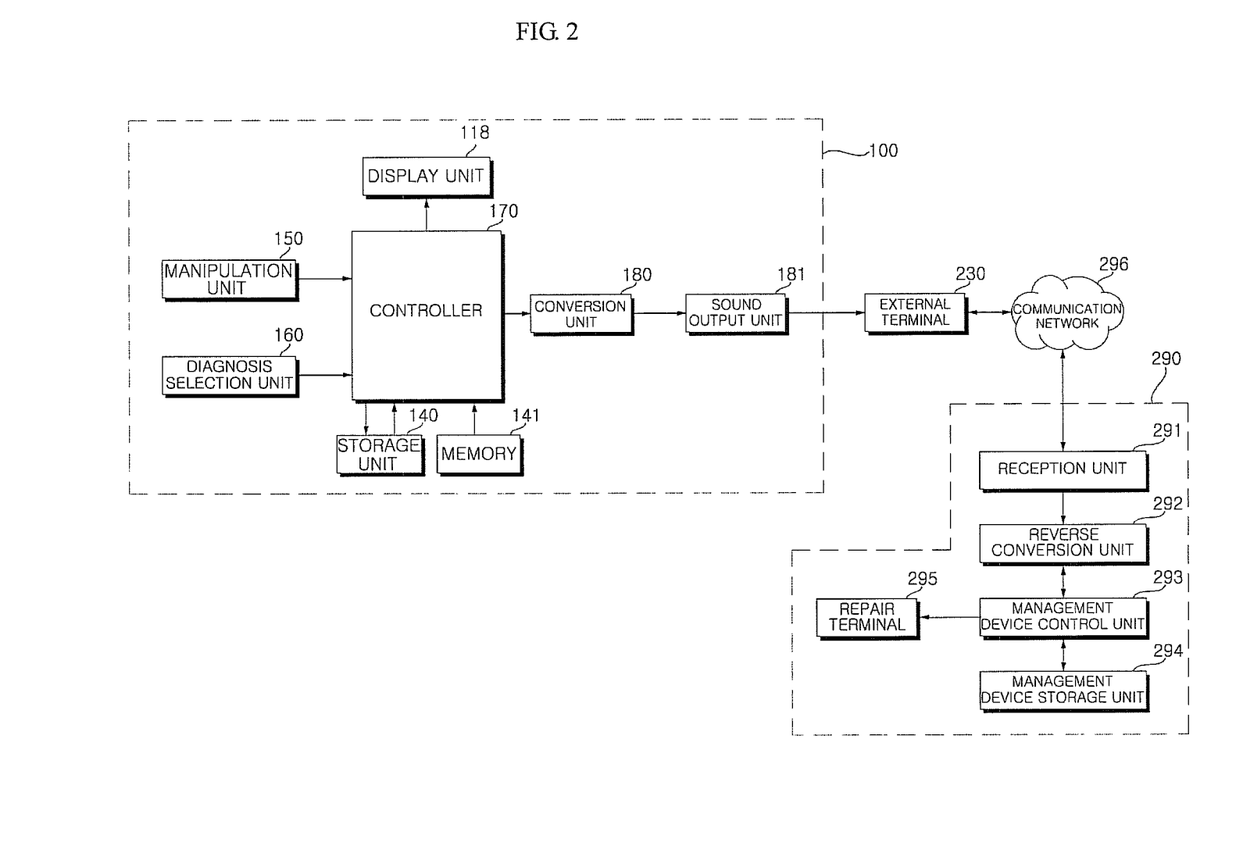
FIG. 2 is a block diagram illustrating a configuration of a home appliance and a diagnostic system including the same according to an embodiment.

FIG. 1 is a view illustrating a process for diagnosing a home appliance according to an embodiment. FIG. 2 is a block diagram illustrating a configuration of a home appliance and a diagnostic system including the same according to an embodiment of the present invention.

Referring to FIG. 1, typically, the home appliance 100 may include a sound output unit 181 such as a buzzer or speaker for outputting a warning sound or confirmation sound, and through this, a user may recognize a failure or abnormal operation of the home appliance 100 in operation S11. Furthermore, the home appliance 100 may provide a function for outputting diagnosis data as a sound that combines specific frequencies. Such a sound signal may be outputted through the sound output unit 181 typically equipped for outputting an alarm sound or confirmation sound (or, an additional sound output means for outputting a sound different from that).

Moreover, a user, who recognizes an abnormality of a home appliance through an alarm sound outputted from the sound output unit 181, may call a service center to describe an abnormal symptom of the home appliance and may inquire about a corresponding solution or request a repair. Of course, regardless of an output of the sound output unit 181, a user may directly recognize an abnormal operation of the home appliance 100, and may contact a service center in some cases in operation S12.

While a call is connected to a service center, a service center agent may file the complaint of the user, and may attempt to give a corresponding solution. In some cases, specific information on a symptom of a home appliance is required.

The agent explains to a user a method of outputting diagnosis data as sound in operation S13. According to the explanation, a user may put the communication terminal 230 close to the sound output unit 181, and then, may manipulates a user input means, equipped in a control panel of the home appliance 100, in order to output a predetermined sound including the diagnosis data through the sound output unit 181. Herein, the diagnosis data may include identification information for identifying the type of the home appliance 100, information on a current driving state or recent driving state of the home appliance 100 (hereinafter, referred to as driving information), setting values set according to a user's manipulation or a running pre-stored algorithm (hereinafter, referred to as setting information), and information stored when a failure or abnormal operation of the home appliance 100 is detected according to a self-diagnosis algorithm (hereinafter, referred to as failure information).

The sound signal including the diagnosis data outputted through the sound output unit 181 may be transmitted to a service center via a communication network in operation S14. The service center may include a management device 290 for receiving the signal sound transmitted via the communication network. The management device 290 may reversely extract the diagnosis data from the signal sound transmitted via the communication network, and may diagnose the home appliance 100 on the basis of the extracted information.

Using the 3G and 4G communication methods, the inventors have found that when the diagnosis data is modulated and transmitted using a carrier frequency in a such a frequency band, due to signal attenuation or distortion occurring during the transmission via the communication network, a reception side that receives the diagnosis data may not accurately extract the diagnosis data. The present disclosure provides a more accurate method of transmitting diagnosis data under 3G and 4G environments, and this will be described in more detail later. In a further advantageous embodiment, the inventors have found that owing to 3G and 4G generation mobile telecommunications suitable for the use of smartphones, the carrier frequencies used for transmitting signals in accordance with the present disclosure are advantageously less than 2 kHz.

Moreover, as is well known, the 3G mobile communication refers to the standard of a mobile phone and a mobile communication, which satisfies the requirements from International Mobile Telecommunications-2000 (IMT-2000) of International Telecommunication Union. The 4G mobile communication succeeds the 3G mobile communication and provides more improved mobile communication environment.

The management device 290, which receives a sound signal including the diagnosis data via a communication network, may again extract the diagnosis data from the signal sound through a reverse conversion process on the signal, and based on this, may diagnose the home appliance 100 through a predetermined diagnosis algorithm.

However, according to an embodiment, the home appliance 100 may run a self-diagnosis algorithm in order to perform a diagnosis, and then, may output its result in the signal sound. In this case, the diagnosis data may include a result generated through a diagnosis algorithm, that is, a diagnosis result.

In either case, the side including the management device 290, for example, the service center, may provide appropriate service to a user on the basis of the diagnosis result, and may dispatch a service man 93 to the home, if necessary in operation S16. Referring to FIG. 2, a home appliance diagnostic system according to an embodiment may include a home appliance 100 for outputting a sound signal including diagnosis data, and a management device 290 for receiving a sound signal outputted from the home appliance 100 via a communication network, and based on this, diagnosing the home appliance 100. Diagnosis data mentioned below will be described as one that is generated by running a self-diagnosis algorithm in the home appliance 100 and using its result, but are not limited thereto. As described above, the diagnosis data may include variables used for running a diagnosis algorithm in the management device 290.

The home appliance 100 may include a manipulation unit 150 for receiving from a user a control command various kinds of information for operation of the home appliance 100, and a diagnosis selection unit 160 for selecting a diagnosis run command. The manipulation unit 150 and the diagnosis selection unit 160 may be separately provided, but according to an embodiment, if an input method of a specific key among manipulation keys such as buttons and dials constituting the manipulation unit 150 is used (for example, when the input length of the power button is more than a predetermined time), the power button may serve as the diagnosis selection unit 160 (as opposed to turning on/off the home appliance 100). Therefore, providing the relatively less used diagnosis selection 160. As another example, when a predetermined pattern is inputted according to the input order of specific keys, this may serve as the diagnosis selection unit 160, which is not the basic function of each key. That is, various embodiments may be possible.

Once a diagnosis command is inputted through the diagnosis selection unit 160, the controller 170 may run the diagnosis algorithm stored in the storage unit 140, on the basis of the diagnosis data stored in the memory 141 or the data called from the memory 141 in order to constitute a packet of an application layer through a predetermined data processing process by using the diagnosis data generated from the diagnosis algorithm, and then, may perform a modulation process through a control of the conversion unit 180 in order to constitute a frame of a physical layer including a combination of symbols corresponding to a carrier frequency. A progressing state of such a process may be displayed through the display unit 118, and the display unit 118 may be implemented with a visual display means such as an LCD and LED, which is typically provided to the control panel in order to display an operational state of the home appliance 100.

Here, the memory 141 may be a recording medium for temporarily storing diagnosis data, and may include RAM, FLASH MEMORY, EDORAM, magnetic recording medium, and recording/deleting possible optical recording medium, regardless of volatile or nonvolatile properties. The storage unit 140 may be a recording medium for storing a diagnosis algorithm, and may be nonvolatile recording medium for retaining recorded data, regardless of power supply of the home appliance 100.

The conversion unit 180 may configure a frame corresponding to the packet generated by the controller 170, and the frame may include symbols corresponding to carrier frequencies constituting the signal sound outputted from the sound output unit 181. According to this embodiment, a frequency signal may be generated from diagnosis data through a quadrature frequency shift Keying QFSK, method. Accordingly, a frequency signal generated by the conversion unit 180 includes a combination of four different carrier frequencies.

The sound output unit 181 may output a signal sound according to the frequency signal, and may be implemented with a buzzer or a speaker. The sound output unit 181 may be a buzzer for outputting four carrier frequencies which are separately distinguished, advantageously, in a frequency band of less than 2 kHz.

Figure 3:
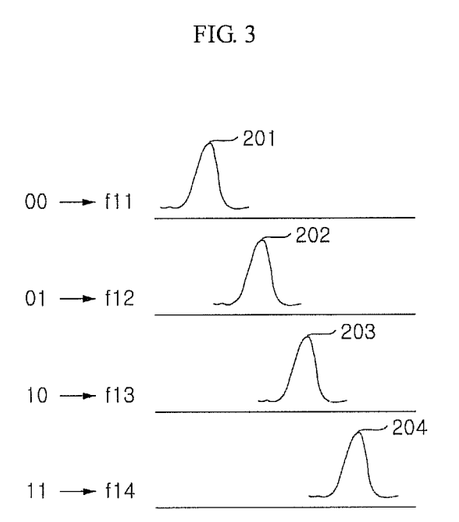
FIG. 3 is a view illustrating carrier frequencies constituting a signal outputted from a home appliance according to an embodiment.
Figure 4:
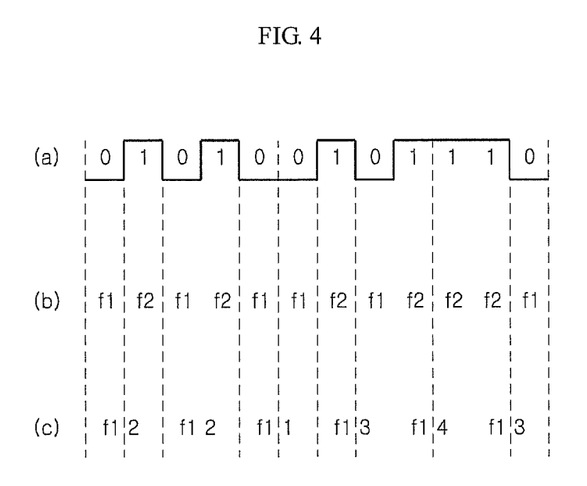
FIG. 4 is a view when data (a) constituting a packet are converted through Binary Frequency Shift Keying (BFSK) method (b) and are converted through Quadrature Frequency Shift Keying (QFSK) method (c)
Figure 5:
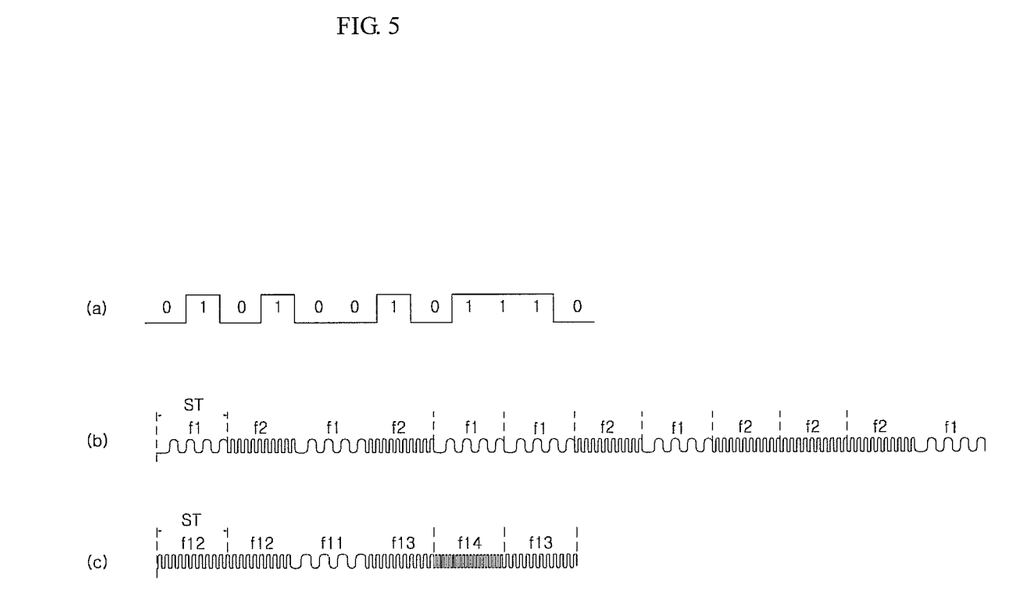
FIG. 5 is a comparison view of an output time (b) using the BFSK method and an output time (c) using the QFSK method when data (a) constituting a packet are outputted under the assumption that a symbol time is identically set.

FIG. 3 is a view illustrating carrier frequencies constituting a signal outputted from a home appliance according to an embodiment. FIG. 4 is a view when data (a) constituting a packet are converted through Binary Frequency Shift Keying (BFSK) method (b) and are converted through Quadrature Frequency Shift Keying (QFSK) method (c). FIG. 5 is a comparison view of an output time (b) using the BFSK method and an output time (c) using the QFSK method when data (a) constituting a packet are outputted, under the assumption that the symbol time is identically set.

Referring to FIG. 3, a home appliance according to this embodiment may convert diagnosis data using the QFSK method, and then, may output them. For this, four carrier frequencies are necessary and shown in FIG. 3.

In the QFSK method, 2 bit data may correspond to one carrier frequency. Hereinafter, the case of modulating data using for different carrier frequencies of f11, f12, f13, and f14 will be described as one example. At this point, a carrier frequency corresponding to data '00' is referred to as f11 201, a carrier frequency corresponding to data '01' is referred to as f12 202, a carrier frequency corresponding to data '10' is referred to as f13 203, and a carrier frequency corresponding to data '11' is referred to as f14 204.

Here, f11, f12, f13 and f14 may be frequency signals having different values and may have values of less than 2 kHz. Each frequency value may have one of frequency values constituting a scale.

Frequency values constituting a scale are widely known. For example, f11, f12, f13 and f14 may be 1396 hz, 1567 hz, 1760 hz, and 1975 hz, respectively. Such values may have F, G, A, B of six octaves based on 12 scales, but are not limited thereto. Here, carrier frequencies are taken not to be adjacent scales, and this is for providing a difference in frequency values in order to clearly distinguish each carrier frequency.

Since carrier frequencies have values constituting a scale, a signal sound outputted through the sound output unit 181 may satisfy the emotional aspect of a user, and since there is enough difference between the values, frequencies may be clearly distinguished, and also, a communication success rate may be improved.

Referring to FIGS. 4 and 5, data '010100101110' (a) may be converted through the BFSK method using different two frequencies f1 and f2 (b) and may be converted through the QFSK method (c). If the output length of the sound signal corresponding to a carrier frequency outputted in correspondence to each symbol (which constitutes a frame in a physical layer (refer to FIG. 8)) is referred to as a symbol time ST, 1 bit corresponds to one symbol in the BFSK method and 2 bits correspond to one symbol in the QFSK method. Therefore, in the case of the same symbol time ST, even when the same amount of data are signalized and outputted, the QFSK method may take a half time of the BFSK method. Accordingly, compared to the BFSK method, the QFSK method may output a larger amount of data as a sound signal within the same time. A home appliance according to an embodiment may therefore complete the output of a sound signal within 3 sec in consideration of modem communication methods, and accordingly, may output a large amount of data as a signal sound within a short time by converting a signal through the QFSK method. The inventors have recognized that modern devices, such as smartphones, have a noise cancelling function which may negatively affect signals in accordance with the present disclosure. There is provided an improved method using QFSK.

Figure 6:
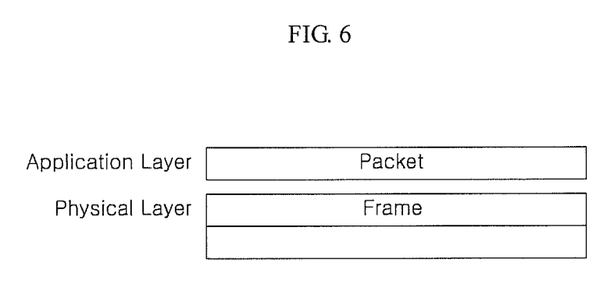
FIG. 6 is a view illustrating a packet in an application layer and a frame in a physical layer corresponding thereto in a home appliance according to an embodiment.
Figure 7:
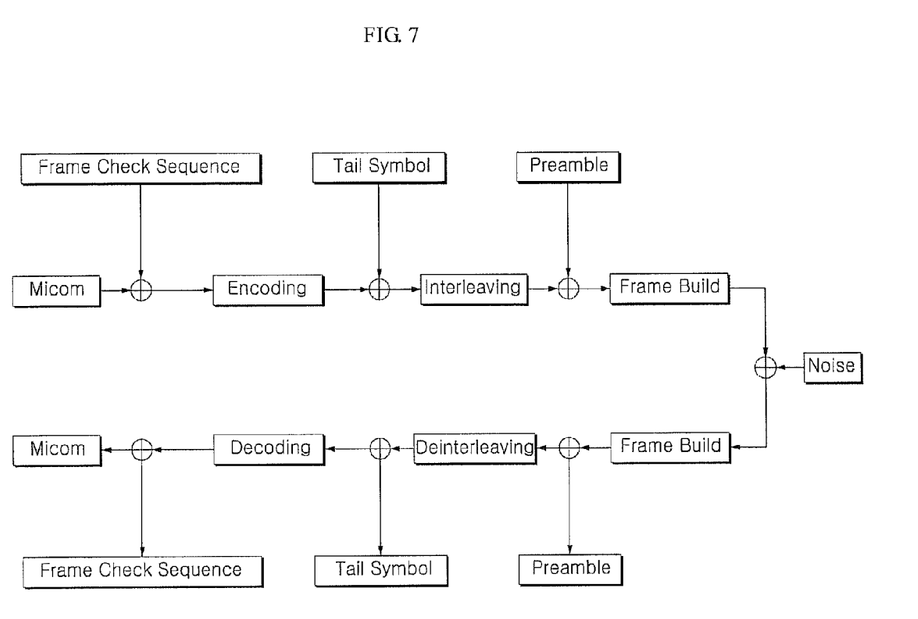
FIG. 7 is a flowchart illustrating a signal converting process in a home appliance diagnosis system.
Figure 8:
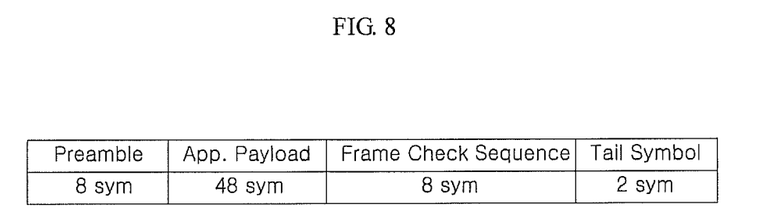
FIG. 8 is a view illustrating a configuration of a frame generated through a signal converting process in the home appliance diagnosis system of FIG. 7.

FIG. 6 is a view illustrating a packet in an application layer and a frame in a physical layer corresponding thereto in a home appliance according to an embodiment. FIG. 7 is a flowchart illustrating a signal converting process in a home appliance diagnosis system. FIG. 8 is a view illustrating a configuration of a frame generated through a signal converting process in the home appliance diagnosis system of FIG. 7.

Referring to FIG. 6, in relation to a home appliance according to an embodiment, one packet in an application layer including diagnosis data may correspond to one frame in a physical layer. That is, data may not be divided into a plurality of frames for transmission, and one frame may include the output start to output end of a signal sound.

Typically, a packet may be divided into several frames and a signal sound may be outputted through a method of putting an Inter Frame Space (IFS) between frames. However, such a method may need to detect a preamble (that is, a pattern signal representing the start of each frame) when a signal sound is received and processed, and even if a signal sound is accurately outputted within a predetermined symbol time according to a communication environment, a delay may occur at the reception side that receives the signal sound. In this case, accuracy in detecting a preamble is deteriorated. In a home appliance according to an embodiment, since an entire signal sound is outputted completely in one frame, a single preamble search may be enough. Therefore, the typical limitations may be resolved.

Referring to FIG. 7, a home appliance according to an embodiment may generate a frame including a plurality of symbols through encoding and interleaving processes by using the transmission information, and during the processes, symbols corresponding to a Frame Check Sequence (FCS), a Tail symbol and a preamble may be added.

In more detail, the controller 170 or Micom may add the FCS on diagnosis data. The FCS may be added data for performing an error detection process (for example, a CRC-8 method) in order to identify whether a frame is correctly transmitted.

Then, the controller 170 may encode the diagnosis data having the FCS added. Such an encoding method may vary, and thus, may include a 1/2 Convolution Encoding method, for example. Especially, the 1/2 Convolution Encoding method may be used in a forward error correction (FEC) method for recovering a symbol error, and in order to restore a bit error, may use a convolutional code through the FEC method.

The encoding may be based on a 1/2 code rate (i.e. one bit is inputted and two bits are outputted). At this point, since the 1/2 code rate requires a lot of redundant bits, a puncturing algorithm may be used in order to reduce the number of redundant bits. Additionally, the tail symbol may be an additional symbol generated during a convolutional encoding process.

The interleaving may be a technique for mixing the order of symbols and transmitting them, which is used when continuous errors occur during signal sound transmission. The interleaving process may interleave the sections of the payload (refer to FIG. 8) corresponding to diagnosis data and the tail symbol.

Moreover, the signal sound outputted according to the configured frame through the home appliance may be transmitted to the management device 290 through the input from the external terminal 230 and a communication network. Then, the management device 290 may detect the preamble according to a pre-agreed protocol, and may obtain the diagnosis data (i.e. payload) through deinterleaving, tail symbol detecting, decoding, and FCS detection processes.

Especially, the decoding may use a Viterbi decoding algorithm, which is easily executed on PC-based software, and such an algorithm may be advantageous to reduce errors in a way of selecting bit patterns having less error from all expectable bit patterns.

Referring to FIG. 8, a total length of a signal sound, which is outputted from an appliance according to an embodiment, does not exceed 3 sec. The frame according to an embodiment may include a preamble having 8 symbols, a payload having 48 symbols (this correspond to 6 bytes of data in an application layer), an FCS having 8 symbols, and a tail symbol having two symbols. Accordingly, the symbol time may be configured to not to exceed 45 ms. The inventors have found that when the symbol time is set too short, an echo effect between carrier frequencies outputted in correspondence to each symbol causes signal interference. Therefore, in theory, the symbol time should be set as long as possible. However, in order to provide the above frame and output a signal sound within 3 sec completely, the inventors have found that, advantageously, the symbol time may be between 40 ms and 45 ms. In the case of 45 ms, since a total output length of a signal sound is 2.98 sec (which is extremely close to 3 sec), noise reduction function may be applied due to delay during signal processing according to the external terminal 230. Therefore, a symbol time of 44 ms may be considered. In this case, all signal sounds are completely outputted within 2.90 sec, and approximately 100% of a communication success rate may be confirmed with almost all terminals.

Although the preferred embodiments have been disclosed for illustrative purposes, those skilled in the art will appreciate that various modifications, additions and substitutions are possible, without departing from the scope and spirit of the disclosure as disclosed in the accompanying claims.

What is claimed is:

1. A home appliance, comprising:
a selection unit that receives a diagnosis command on the home appliance from a user;
a memory that stores diagnosis data on the home appliance;
a controller that processes the diagnosis data stored in the memory in order to generate a packet according to a diagnosis command input through the selection unit;
a conversion unit that generates a frame including a combination of symbols, which respectively correspond to four different carrier frequencies, on the basis of data constituting the packet, according to a Quadrature Frequency Shift Keying (QFSK) method.

2. The home appliance of claim 1, wherein the four different carrier frequencies have values of less than 2 kHz.

3. The home appliance of claim 2, wherein the four different carrier frequencies constitute a scale.

4. The home appliance of claim 3, wherein the four different frequencies are based on 12 scales, and an interval between carrier frequencies has at least one scale.

5. The home appliance of claim 3, wherein the lowest one of the four different frequencies has a value of more than 1.3 kHz.

6. The home appliance of claim 1, wherein a symbol time, which is an output length of one carrier frequency outputted in correspondence to each symbol, is between 40 ms and 45 ms.

7. The home appliance of claim 1, wherein a total output time of a signal sound corresponding to the frame does not exceed 3 sec.

8. The home appliance of claim 1, wherein the conversion unit creates one frame in correspondence to the packet.

9. The home appliance of claim 8, wherein the frame comprises a continuous combination of symbols.

10. The home appliance of claim 1, wherein the controller performs a 1/2 code rate based encoding on the basis of the diagnosis data.

11. The home appliance of claim 10, wherein the controller adds a Frame Check Sequence (FCS) on the diagnosis data, and based on this, performs the encoding process.

12. The home appliance of claim 10, wherein the packet comprises data generated additionally during the encoding process.

13. The home appliance of claim 12, wherein the controller performs an interleaving process, including the added data.

14. The home appliance of claim 13, wherein the frame comprises a preamble added on symbols corresponding to the interleaved data.

15. The home appliance of claim 1, wherein the controller generates the diagnosis data by running a predetermined diagnosis algorithm to perform a diagnosis on the home appliance.

16. The home appliance of claim 1, further comprising a storage that stores the diagnosis algorithm.

17. A method of outputting a signal sound for diagnosing a home appliance, the method comprising:
generating a frame, which includes a combination of symbols respectively corresponding to four carrier frequencies, on the basis of bits constituting diagnosis data of the home appliance through a Quadrature Frequency Shift Key (QFSK) signal modulation; and
outputting the carrier frequencies as a sound signal according to the symbols constituting the frame,
wherein the generating of the frame includes:
adding a Frame Check Sequence (FCS) on diagnosis data;
encoding data having the FCS added;
adding a tail symbol which is additionally generated during the encoding process; and
adding a preamble of a specific pattern for notifying a start of the frame.

18. The method of claim 17, further comprising performing an interleaving process between the adding of the tail symbol and the adding of the preamble.

19. The method of claim 18, wherein the encoding of the data is based on a 1/2 code rate.

20. The method of claim 19, wherein the frame comprises a preamble including 8 symbols, a payload having 48 symbols corresponding to the diagnosis data, an FCS including 8 symbols, and a tail symbol including 2 symbols.

21. The method of claim 17, wherein an output length of a carrier frequency outputted in correspondence to one symbol is between 40 ms and 45 ms.

22. The method of claim 21, wherein the generating of the frame comprises generating a frame including a continuous combination of symbols.

23. The method of claim 17, wherein the four different carrier frequencies have values of less than 2 kHz.

24. The method of claim 23, wherein the four different carrier frequencies constitute a scale.

* * * * *